(12) United States Patent  (10) Patent No.: US 9,340,082 B2
Hintzen et al.  (45) Date of Patent: May 17, 2016

(54) VEHICLE WHEEL SUSPENSIONS

(71) Applicant: FORD GLOBAL TECHNOLOGIES, LLC, Dearborn, MI (US)

(72) Inventors: Ralf Hintzen, Aachen (DE); Friedrich Peter Wolf-Monheim, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/693,378

(22) Filed: Apr. 22, 2015

(65) Prior Publication Data
US 2015/0306932 A1 Oct. 29, 2015

(30) Foreign Application Priority Data
Apr. 25, 2014 (DE) .......... 10 2014 207 793

(51) Int. Cl.
*B60G 7/00* (2006.01)
*B60G 7/02* (2006.01)

(52) U.S. Cl.
CPC .......... *B60G 7/001* (2013.01); *B60G 7/005* (2013.01); *B60G 7/02* (2013.01); *B60G 2204/416* (2013.01); *B60G 2206/121* (2013.01)

(58) Field of Classification Search
CPC .......... B60G 7/001; B60G 7/005; B60G 7/02; B60G 2206/121; B60G 2204/416
See application file for complete search history.

(56) References Cited

U.S. PATENT DOCUMENTS

| | | | | |
|---|---|---|---|---|
| 5,080,388 A | * | 1/1992 | Berry | B60G 3/20 280/124.136 |
| 6,099,005 A | * | 8/2000 | Wakatsuki | B60G 3/20 280/124.135 |
| 6,413,003 B1 | * | 7/2002 | Schmidt | B62D 7/16 403/120 |
| 7,506,883 B2 | * | 3/2009 | Downs | B60G 7/005 280/124.134 |

FOREIGN PATENT DOCUMENTS

DE 20 2014 101 981 U1 6/2014

* cited by examiner

*Primary Examiner* — Laura Freedman
(74) *Attorney, Agent, or Firm* — Jones Robb, PLLC; Raymond L. Coppielle

(57) ABSTRACT

A wheel suspension for a vehicle may include a wheel carrier and a torsionally stiff transverse control arm. The control arm may include a first front joint element and a first rear joint element pivotably mounted to the wheel carrier. The first front joint element may include a moveable bearing configured to transmit forces only in a direction that is parallel to a vertical axis of the vehicle.

19 Claims, 6 Drawing Sheets

VEHICLE WHEEL SUSPENSIONS

CROSS REFERENCE TO RELATED APPLICATIONS

This application claims priority to German Application No. 102014207793.1, filed on Apr. 25, 2014, the entire content of which is incorporated by reference herein.

TECHNICAL FIELD

The present disclosure relates generally to vehicle wheel suspensions. In particular, the present disclosure relates to integral link rear wheel suspensions for motor vehicles.

BACKGROUND

A vehicle's wheel suspension system plays a vital role in both serving to isolate the occupants of the vehicle from the irregularities of the road surface, and helping to control the stability of the vehicle by managing the relative position of the wheels to the vehicle body during the vehicle's operation. Suspension systems can take various forms, including, for example, a double wishbone suspension, a multi-link suspension, and an integral link suspension.

Integral link suspensions, for example, may have two joint elements, a rear joint element and a front joint element, between a four-point control arm (i.e., H-arm) and the wheel carrier (i.e., knuckle). The rear joint element is generally stiff in all spatial directions (X, Y and Z), while the front joint element only needs to be stiff in the vertical direction (Z). In conventional integral link suspensions, the front joint element is therefore generally configured such that it is particularly stiff in a direction parallel to a vertical axis of the vehicle (i.e., the Z axis), in comparison with the remaining two spatial directions (X and Y). For example, in one conventional suspension design, the front joint element is a rubber-elastic bushing, wherein the rubber material of the bushing has a substantially greater stiffness in the Z direction than in the X and Y directions. In another conventional suspension design, the front joint element is attached to an integral control arm, which forms an articulated connection between the transverse control arm (i.e., of the H-arm) and the wheel carrier. Both conventional designs, however, take up a large amount of space, and due to the number of necessary components for each joint configuration, increase the weight, and therefore the cost, of the wheel suspension.

It may, therefore, be advantageous to provide an integral link suspension design that requires less package space, while maintaining the good driving dynamics generally associated with such suspensions. It may also be advantageous to provide an integral link suspension that is lighter and less costly to manufacture.

SUMMARY

In accordance with various embodiments of the present disclosure, a wheel suspension for a vehicle may include a wheel carrier and a torsionally stiff transverse control arm. The control arm may include a first front joint element and a first rear joint element pivotably mounted to the wheel carrier. The first front joint element may include a moveable bearing configured to transmit forces only in a direction that is parallel to a vertical axis of the vehicle.

In accordance with various additional embodiments of the present disclosure, a wheel suspension for a vehicle may include a wheel carrier disposed within an internal space of a rear wheel of the vehicle. The wheel suspension may further include a torsionally stiff transverse control arm pivotably mounted to the wheel carrier and extending between the wheel carrier and a frame rail of the vehicle. The control arm may be pivotably mounted to the wheel carrier via first front and rear joint elements and pivotably mounted to the frame rail via second front and rear joint elements. The first front joint element may include a moveable bearing configured to transmit forces only in a direction that is parallel to a vertical axis of the vehicle.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
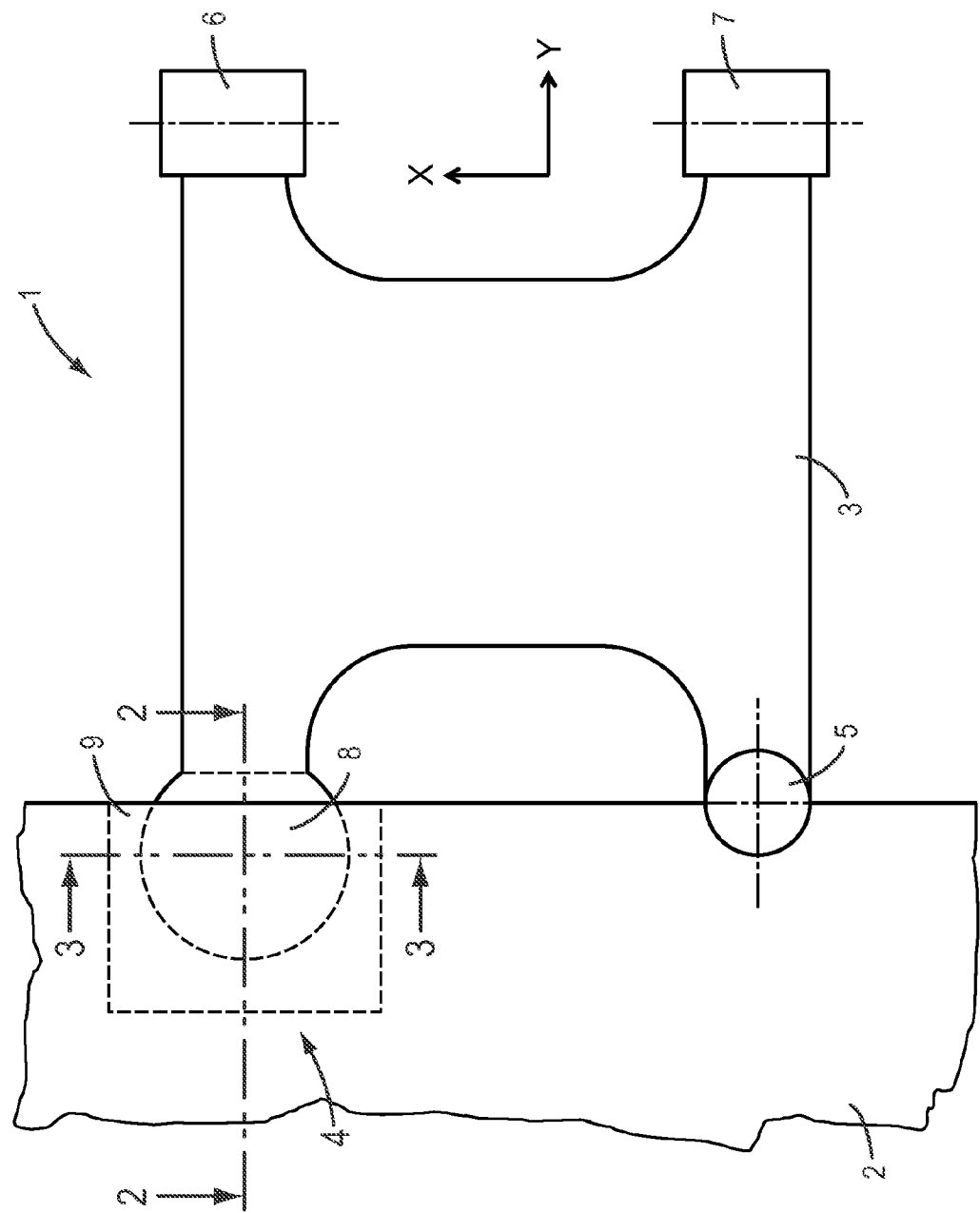
FIG. 1 is a top view of an exemplary embodiment of an integral link suspension in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

In accordance with various exemplary embodiments, the present disclosure contemplates integral link wheel suspensions for a motor vehicle that function similar to conventional integral link suspensions, while taking up less package space and having a reduced cost and weight. For instance, the exemplary embodiments described herein contemplate utilizing a movable bearing for the front joint element instead of a rubber-elastic bushing or an articulated connection.

As used herein, a moveable bearing is a bearing that can transmit forces in one or two of the three spatial directions (X, Y, and Z), and which has substantially no force-transmitting connection in the remaining spatial direction or directions. As would be understood by those of ordinary skill in the art, a moveable bearing is substantially more simple and economical to construct, compared with, for example, a control arm bearing with a rubber-elastic bushing in which the rubber-elastic material has different degrees of stiffness depending on direction. In particular, in a moveable bearing, no rubber bushing is required, since the respective degrees of freedom of movement of the bearing are determined not by the stiffness of a rubber-elastic material but by the moveable bearing itself. Consequently, the moveable bearing is more compact in construction than a rubber-metal bearing. In addition, there is no need to use an integral control arm for articulated connection of the corresponding transverse control arm bearing point to the wheel carrier, which also saves both construction space and weight, and reduces production costs for the wheel suspension.

In accordance with various embodiments of the present disclosure, the moveable bearing can transmit forces in only one of three spatial directions (X, Y, and Z). Consequently, the moveable bearing has substantially no force-transmitting connection in two of the three spatial directions, so that movements of the transverse control arm relative to the wheel carrier are possible in the plane defined by these two spatial directions. As a result, the desired driving dynamic properties of the wheel suspension can also be established in a targeted fashion.

Various embodiments of the present disclosure contemplate, for example, wheel suspensions including a wheel carrier and a torsionally stiff transverse control arm, such as, for example, an H-arm or 4-point control arm, that is pivotably mounted to the wheel carrier via a first front joint element and a first rear joint element, wherein the first front joint element is a moveable bearing configured to transmit forces only in a direction that is parallel to a vertical axis (Z) of the vehicle. Consequently, in such embodiments, the moveable bearing allows relative movements between the wheel carrier and the transverse control arm in the direction of a vehicle longitudinal axis (direction of travel) and in a vehicle lateral axis (direction transverse to direction of travel). Thus, a relative movement is possible between the first front joint element and the transverse control arm, such that in particular upon braking of the vehicle and/or upon cornering, a desired toe change results from the connection between the wheel carrier and a frame rail of the vehicle. Furthermore, over-determination of the wheel suspension kinematics is avoided due to the degree of freedom of movement that is predefined by the moveable bearing.

As used herein the terms "front" and "rear" refer to the relative location of each joint element (i.e., while mounted to a respective wheel carrier and/or frame rail of the vehicle) to the front and rear of the vehicle. In other words, each control arm is configured to extend between a respective wheel carrier and a frame rail of the vehicle, and is mounted by a first set of joint elements to the wheel carrier and by a second set of joint elements to the frame rail. The joint elements that are located on the front of the control arm (which are positioned towards the front of the vehicle) are therefore referred to as front joint elements, and the joint elements that are located on the back of the control arm (which are positioned towards the rear of the vehicle) are referred to as rear joint elements.

As used herein, the term "frame rail" refers to any type of vehicle frame rail, including but not limited to, rails that form the main superstructure of the chassis of the motor vehicle and subframe rails that form frame sections that attach to the chassis.

In accordance with various embodiments, the moveable bearing may be formed by an extension on the control arm that is received in a recess in the wheel carrier. For instance, to create a bearing that transmits forces only in a direction parallel to the vertical axis (Z) of the vehicle, in various exemplary embodiments, the recess may have an inner diameter that is substantially larger than a corresponding outer diameter of the extension in the special directions X and Y, while having an inner diameter that is insignificantly larger than a corresponding outer diameter in the special direction Z. In other words, the recess may have an inner diameter that is substantially larger than a corresponding outer diameter of the extension: (1) in a direction that is parallel to the longitudinal axis of the vehicle, and (2) in a direction that is parallel to the lateral axis of the vehicle, while the inner diameter of the recess is insignificantly larger than the corresponding outer diameter of the extension in the direction parallel to the vertical axis of the vehicle. Thus, forces may be transmitted in the spatial direction Z, in which the inner diameter of the recess is substantially equal to the corresponding outer diameter of the extension. In the two other spatial directions (X and Y), due to the substantial difference between the inner diameter of the recess and the outer diameter of the extension, there is sufficient freedom of movement for the extension to move in the recess. The freedom of movement in the respective spatial directions is, therefore, dimensioned such that relative movements are possible between the extension and the recess, as would normally be allowed by the wheel suspension kinematics depending on driving dynamics. The moveable bearing, therefore, does not limit the relative movement between the extension and the recess in the two permitted spatial directions (X and Y).

As discussed in detail below, a first exemplary embodiment of the present disclosure contemplates an extension that is spherically shaped (i.e., is spherical at an end that engages the recess), and a second exemplary embodiment of the present disclosure contemplates an extension that is cylindrically shaped (i.e., is cylindrical at the end that engages the recess). In the latter case, a longitudinal axis of the cylinder is oriented substantially parallel to the longitudinal axis of the vehicle. Both alternative embodiment shapes of the extension allow for a low-friction mounting of the extension in the recess, due to spot-like contact points between the extension end and the recess (spherical design) or the at most linear contact points between the extension end and the recess (cylindrical embodiment). Also both the spherical and the cylindrical designs allow a relatively stiff connection of an outer face of the extension to an inner face of the recess at the point where the two surfaces touch in spot-like or linear contact. In this direction, therefore, a robust force transmission is guaranteed.

In accordance with various additional embodiments, the first rear joint element may include a ball bearing, which can transmit forces in all three spatial directions (X, Y, and Z) and is formed stiff. Accordingly, in conjunction with the first front joint element (which is a movable bearing), the first rear joint element allows rotation of the wheel carrier relative to the transverse control arm about a rotation axis established through the ball bearing, which extends in the force-transmission direction of the moveable bearing. As a result, the suspension can achieve a desired toe adjustment of the wheel held by the wheel carrier (i.e., on the vehicle frame), under the effects of braking forces on the wheel suspension. Furthermore, in conjunction with the cylindrical or spherical design of the extension as described above, the wheel carrier can rotate relative to the transverse control arm about the axis defined by the connecting line between the moveable bearing and the ball bearing. Kinematic and elasto-kinematic toe changes can be achieved for example with the aid of a toe link positioned in front of the H-arm or 4-point control arm.

Moreover, spring movements (spring compression and extension) of the wheel suspension, and vibrations introduced into the moveable bearing during vehicle travel may advantageously prevent the undesirable so-called stick-slip effect in the moveable bearing, and in particular prevent a slipping back of the extension moving relative to the recess.

Figure 4:
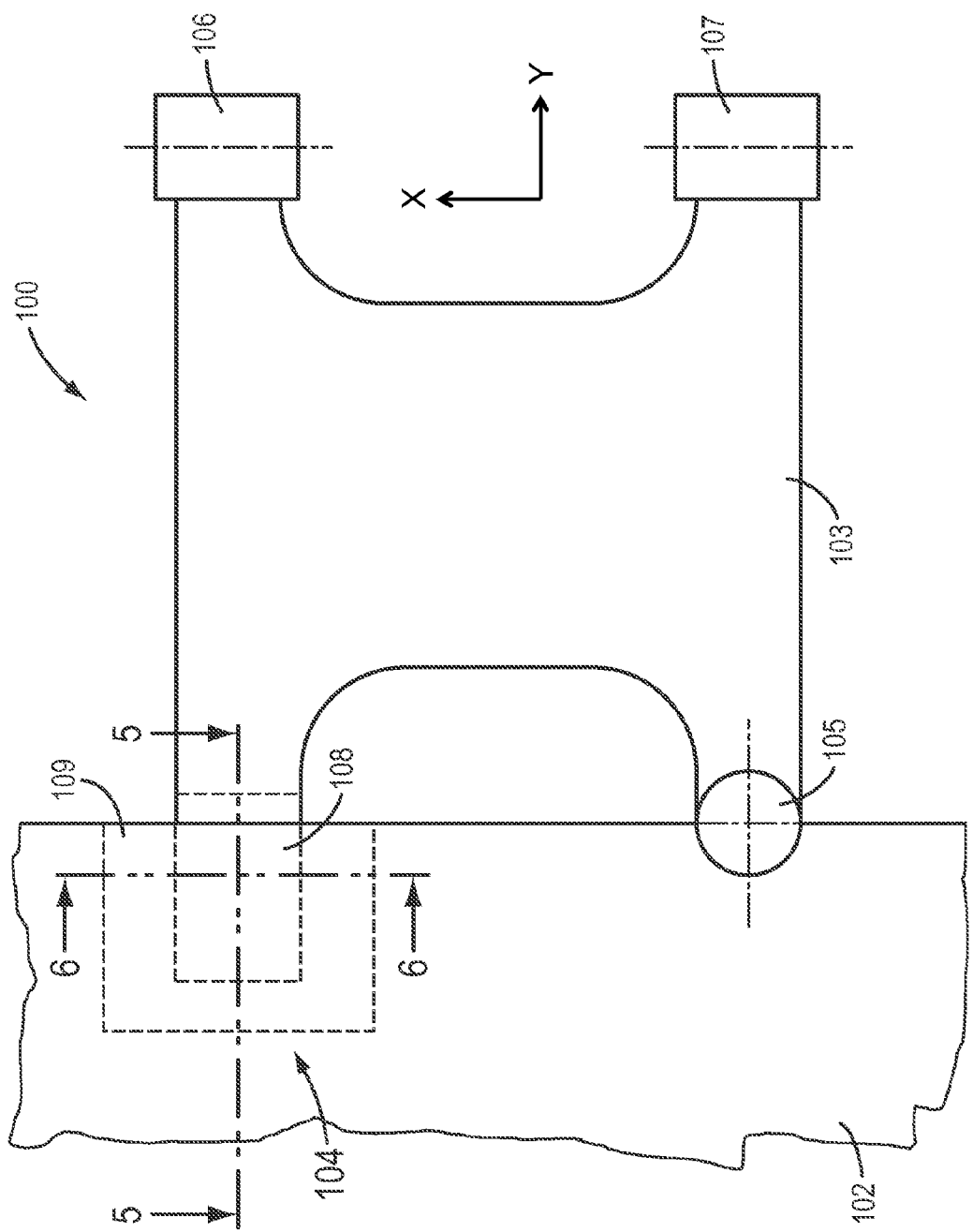
FIG. 4 is a top view of another exemplary embodiment of an integral link suspension in accordance with the present disclosure.

With reference now to the figures, FIGS. 1 and 4 respectively show a top view of wheel suspensions 1 and 100 in accordance with the present disclosure. The spatial directions X and Y shown in FIGS. 1 and 4 constitute a direction parallel to the vehicle longitudinal axis (X direction) and a direction parallel to the vehicle lateral axis (Y direction).

As shown in FIGS. 1 and 4, the wheel suspensions 1, 100 include a wheel carrier 2, 102 which may bear a wheel (not shown) rotatably. In accordance with various embodiments, for example, the wheel carrier is configured to be disposed within an internal space of a rear wheel of the vehicle (not shown). The wheel carrier 2, 102 is pivotably mounted on a torsionally stiff transverse control arm 3, 103, which in turn is pivotably mounted to a vehicle frame rail (not shown) or on a subframe (also not shown) connected to the vehicle superstructure. For this, the transverse control arm 3, 103 has two joint elements for pivotably mounting the control arm 3, 103 to the wheel carrier 2, 102, a first front joint element 4, 104 and a first rear joint element 5, 105. And, two joint elements for pivotably mounting the control arm 3, 103 to the vehicle frame rail (not shown), a second front joint element 6, 106 and a second rear joint element 7, 107. In accordance with various embodiments, for example, the first rear joint element 5, 105 may be a ball bearing (which can transmit forces in all three spatial directions X, Y and Z and is formed stiff), and the second front and rear joint elements 6, 106 and 7, 107 may be conventional rubber-metal bushings.

As above, in various exemplary embodiments of the present disclosure, the first front joint element 4, 104 is a moveable bearing which, in the exemplary embodiments of the wheel suspensions 1, 100 shown in FIGS. 1 and 4, can transmit forces only in a spatial direction Z running perpendicular to the spatial directions X and Y given in FIGS. 1 and 4. The spatial direction Z corresponds to a direction parallel to a vertical axis of the vehicle.

Figure 2:
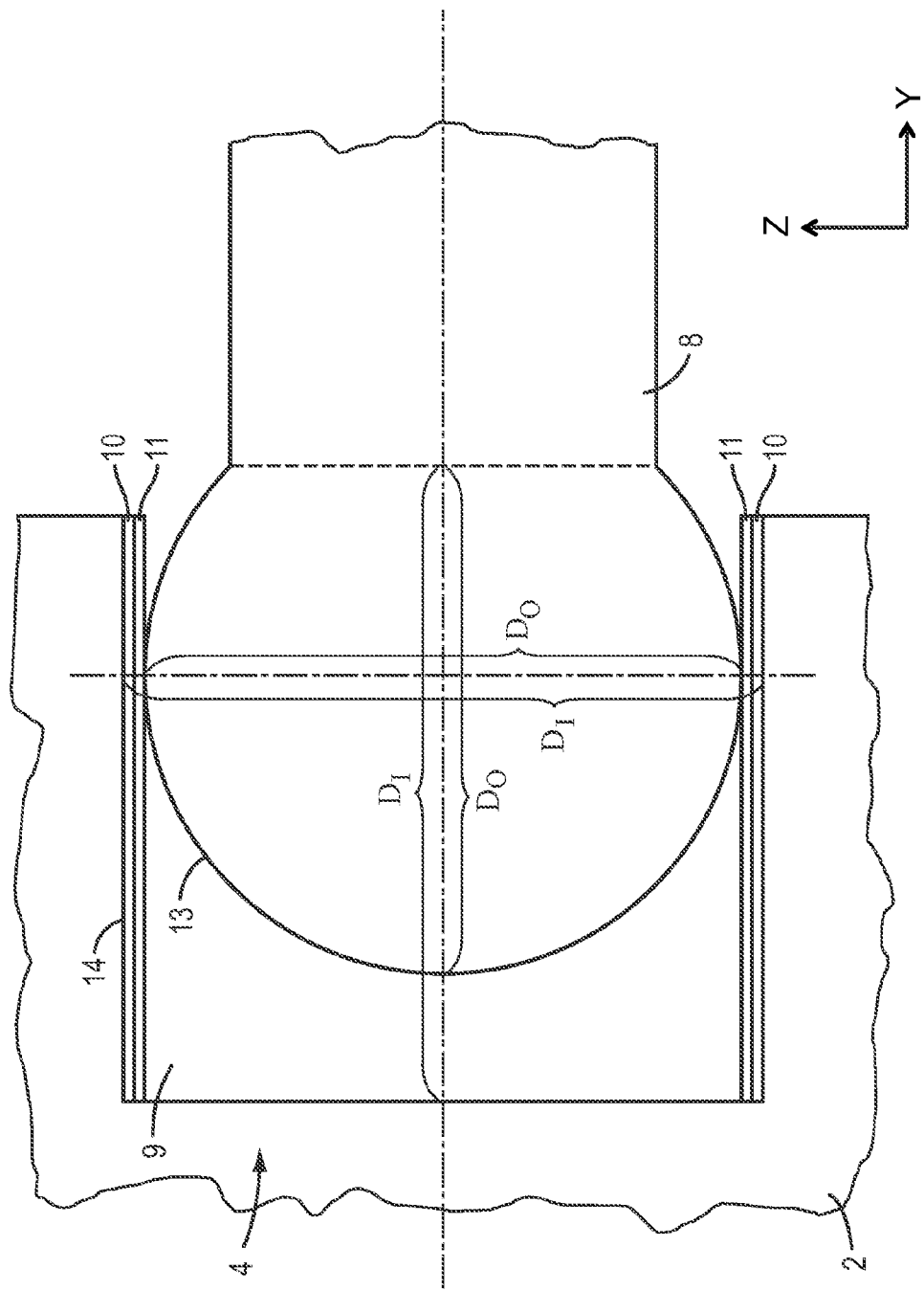
FIG. 2 is a cross-sectional view of the suspension of FIG. 1 taken through line 2-2 of FIG. 1.
Figure 3:
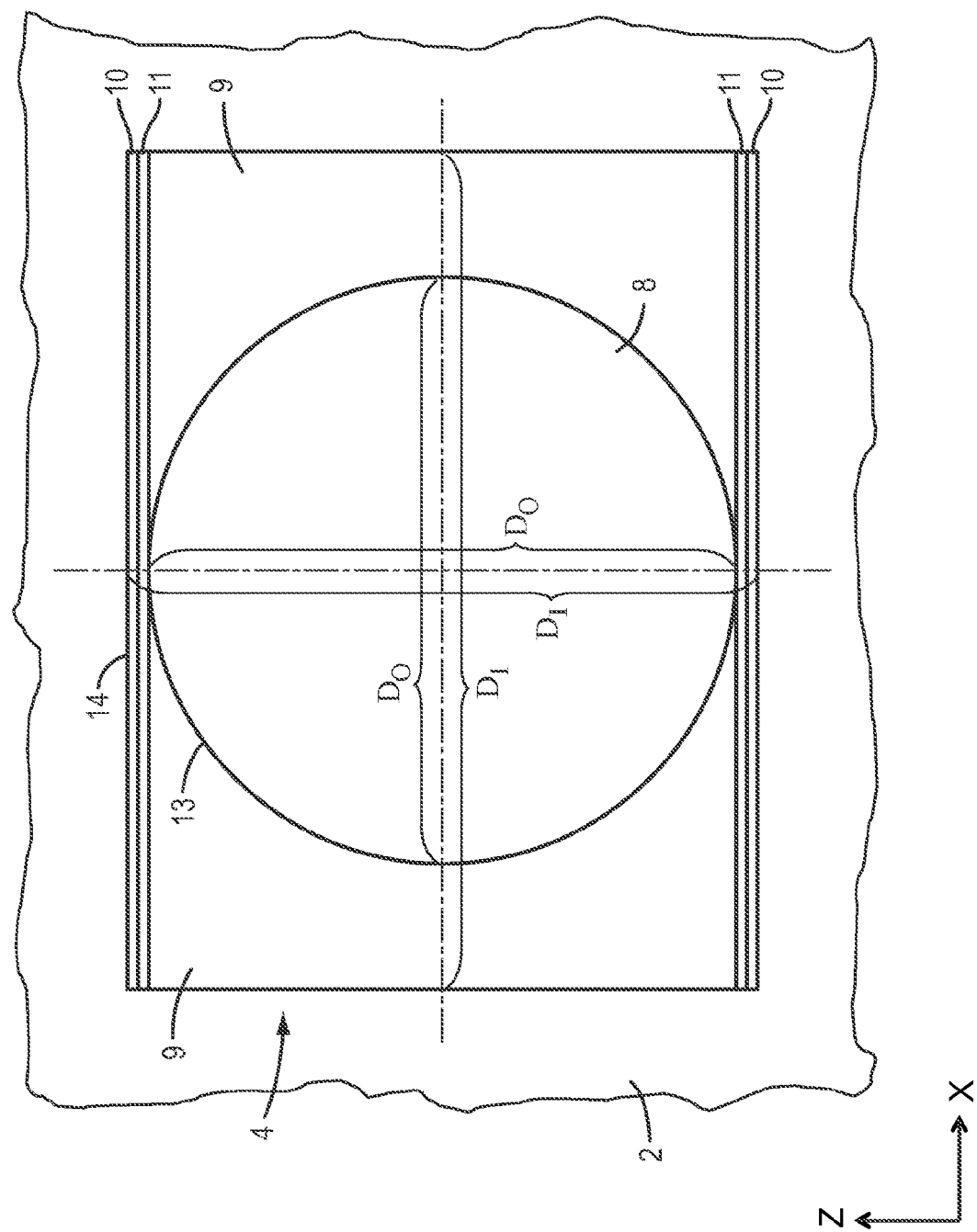
FIG. 3 is another cross-sectional view of the suspension of FIG. 1 taken through line 3-3 of FIG. 1.
Figure 5:
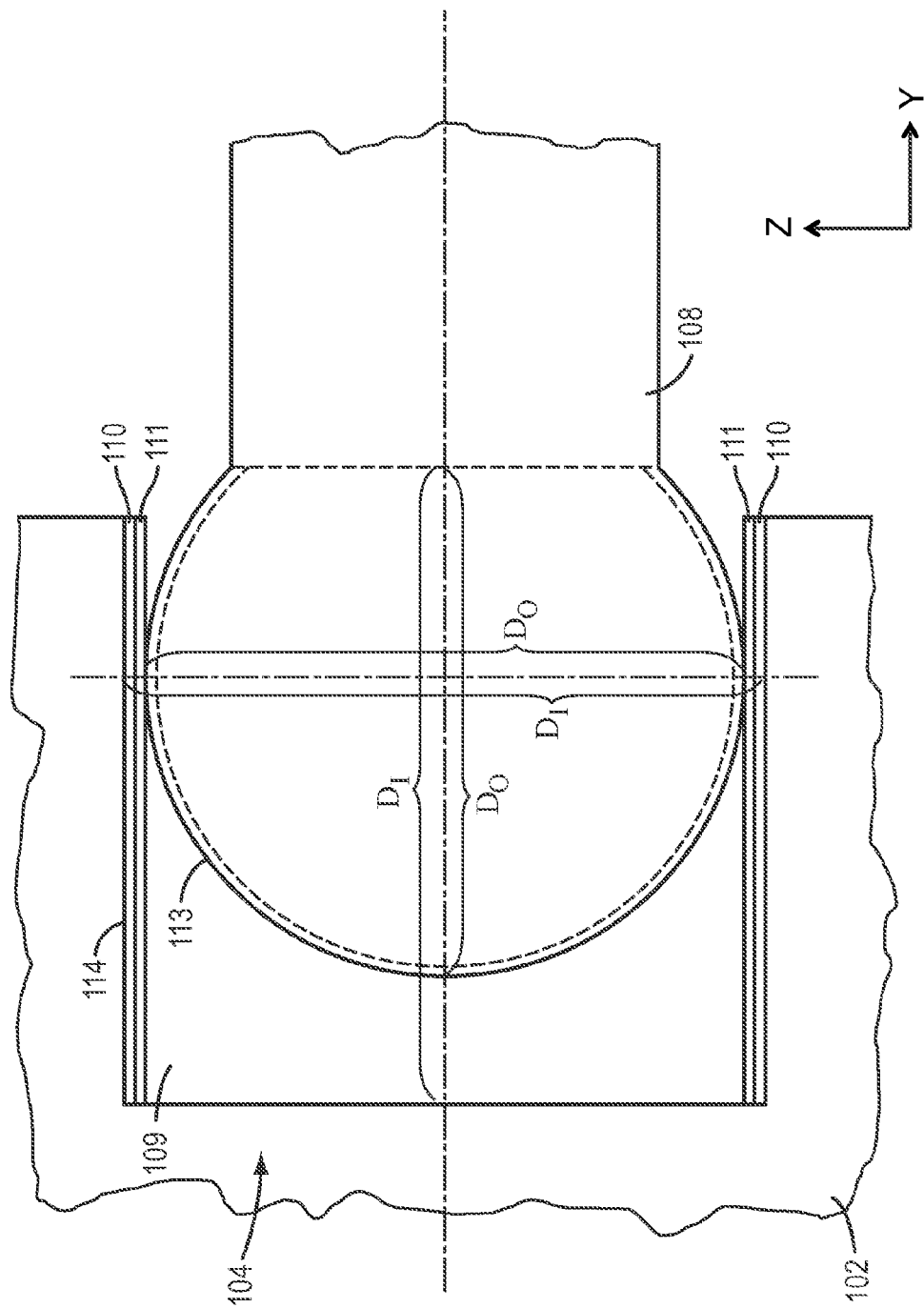
FIG. 5 is a cross-sectional view of the suspension of FIG. 4 taken through line 5-5 of FIG. 4.
Figure 6:
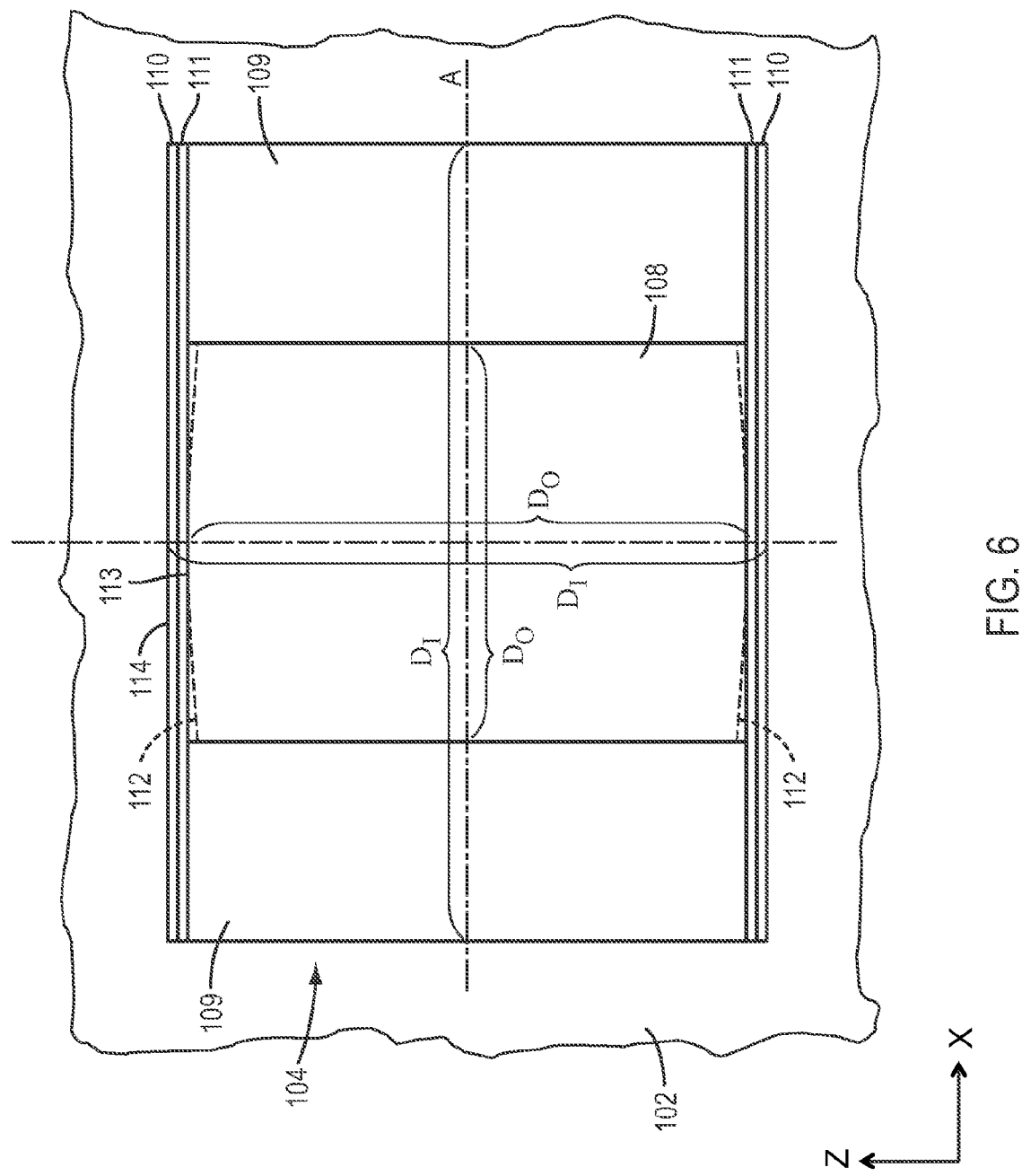
FIG. 6 is another cross-sectional view of the suspension of FIG. 4 taken through line 6-6 of FIG. 1.

The moveable bearing 4, 104 is substantially formed by an extension 8, 108 on the control arm 3, 103, which is held in a recess 9, 109 in the wheel carrier 2, 102. In various embodiments, for example, as shown in FIGS. 1-3, the extension 8 has a substantially spherical shape and the recess 9 has a substantially rectangular shape. While, in various additional embodiments, as shown in FIGS. 4-6, the extension 108 has a substantially cylindrical shape and the recess 109 has a substantially rectangular shape. As illustrated best perhaps in the cross-sectional views of FIGS. 2 and 3 and FIGS. 5 and 6, the recess 9, 109 has a substantially larger inner diameter $D_I$ in the X and Y directions than the corresponding outer diameter $D_O$ of the extension 8, 108 in the X and Y directions. In the remaining spatial direction Z, the inner diameter $D_I$ of the recess 9, 109 is, however, insignificantly larger than the corresponding outer diameter $D_O$ of the extension 8, 108.

Those of ordinary skill in the art would understand, however, that the wheel suspensions shown in FIGS. 1-6 are exemplary only in that the joint elements and the wheel carriers to which the joint elements are connected, may have various alternative configurations (i.e., shapes and/or cross-sections), lengths, dimensions, and/or connection points without departing from the scope of the present disclosure and claims. Furthermore, the movable bearings (and extensions and recesses forming the bearings) are not limited to the shapes and cross-sections shown, but may have various shapes, cross-sections, dimensions and/or configurations.

As also shown in the cross-sectional views of FIGS. 2 and 3 and FIGS. 5 and 6, in various embodiments, an elastic element 10, 110 with high stiffness may be inserted between an outer face 13, 113 of the extension 8, 108 and an inner face 14, 114 of the recess 9, 109. In various embodiments, for example, the elastic element 10, 110 may be arranged on the inner face 14, 114 of the recess 9, 109, at least in the Z direction in which the moveable bearing 4, 104 can transmit forces. In various additional exemplary embodiments, the elastic element 10, 110 may be arranged on the outer face 13, 113 of the extension 8, 108, which is received within the recess 9, 109. The elastic element 10, 110 may ensure, for example, that there is adequate vibration isolation between the wheel carrier 2, 102 and the transverse control arm 3, 103, while at the same time allowing for a high caster stiffness of the wheel suspension 1, 100 about the vehicle's lateral axis. The elastic element 10, 110 may be made from various elastic materials, including, but not limited to, a rubber material or a plastic material.

In various additional embodiments, to further reduce the friction between the extension and the recess, a friction-reducing element 11, 111, for example, a friction-reducing coating, may be applied to the elastic element 10, 110, and thus also be arranged between the inner face 14, 114 of the recess 9, 109 and the outer face 13, 113 of the extension 8, 108. The friction-reducing element 11, 111 may also be present in the form of a lubricant film between the inner face 14, 114 of the recess 9, 109 and the outer face 13, 113 of the extension 8, 108. In embodiments where the elastic element 10, 110 is arranged on the extension 8, 108, the friction-reducing element 11, 111 could equally be arranged on an outer face of the elastic element 11, 111 or the inner face 14, 114 of the recess 9, 109.

As above, various embodiments of the present disclosure contemplate an extension 8 having a substantially spherical shape as shown in FIGS. 1-3. And, various additional embodiments of the present disclosure contemplate an extension 108 having a substantially cylindrical shape as shown in FIGS. 4-6. Accordingly, as illustrated in FIGS. 2 and 5, the end of the extension 8, 108 (which is held within the recess 9, 109) may have a substantially circular cross-section in the YZ plane. As shown in FIG. 6, however, in the cylindrical embodiment, the end of the extension 108 may have a substantially cylindrical cross-section in the XZ plane, such that a longitudinal axis A of the cylinder is oriented substantially parallel to a longitudinal axis of the vehicle, or is parallel to the X axis which stands perpendicular to the Y and Z directions. As also shown in FIG. 6, in various embodiments, the cylinder or casing surface 112 is formed slightly crowned in order to prevent a tilting of the cylinder surface 112 in the recess 109 under the relative movement of the extension 108 in the recess 109. Furthermore, the crowning of the cylinder surface 112 may lead to a reduction in friction between the cylinder surface 112 and the inner face 114 of the recess 109 at the contact points in the X and Y directions, which are reduced because of the crowning.

As above, both embodiments described herein (the spherical embodiment and the cylindrical embodiment) allow a relative movement between the extension 8, 108 and the recess 9, 109 both in the lateral direction (Y direction) and in the longitudinal direction (X direction). Consequently, in conjunction with the first rear joint element 5, 105 (which is a ball bearing), the wheel carrier 2, 102 can rotate relative to the transverse control arm 3, 103 about a rotation axis defined by the first rear joint element 5, 105 and extending in the Z direction, which may lead to a desired toe adjustment under the effect of braking and/or lateral forces acting on the wheel suspension 1, 100.

Furthermore, in both embodiments described herein, the wheel carrier 2, 102 can also rotate relative to the transverse control arm 3, 103 about a rotation axis which is defined by the connecting line between the first front joint element 4, 104 (which is a moveable bearing) and the first rear joint element 5, 105 (which is a ball bearing). Also, both the spherical and cylindrical designs allow a relatively stiff connection of the outer face 13, 113 of the extension 8, 108 to the inner face 14, 114 of the recess 9, 109 at the point where the two faces touch in the Z direction in a spot-like or linear contact. A robust force transmission between the wheel carrier 2, 102 and the transverse control arm 3, 103 is, therefore, guaranteed in the Z direction.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims. Furthermore, although the present disclosure has been discussed with relation to motor vehicles, those of ordinary skill in the art would understand that the present teachings as disclosed would work equally well for any type of vehicle having one or more wheels connected to the vehicle via a suspension.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A wheel suspension for a vehicle, comprising:
 a wheel carrier; and
 a torsionally stiff transverse control arm,
 wherein the control arm comprises a first front joint element and a first rear joint element pivotably mounted to the wheel carrier, and
 wherein the first front joint element comprises a moveable bearing configured to transmit forces only in a direction that is parallel to a vertical axis of the vehicle.

2. The wheel suspension of claim 1, wherein the control arm further comprises a second front joint element and a second rear joint element, wherein the second joint elements are configured to be pivotably mounted to a frame rail of the vehicle.

3. The wheel suspension of claim 1, wherein the moveable bearing is formed by an extension on the control arm that is received in a recess in the wheel carrier.

4. The wheel suspension of claim 3, wherein the recess has an inner diameter that is substantially larger than a corresponding outer diameter of the extension in a direction that is parallel to longitudinal axis of the vehicle and in a direction that is parallel to a lateral axis of the vehicle, and wherein the inner diameter of the recess is insignificantly larger than the corresponding outer diameter of the extension in the direction parallel to the vertical axis of the vehicle.

5. The wheel suspension of claim 3, wherein the extension has a substantially spherical shape.

6. The wheel suspension of claim 3, wherein the extension has a substantially cylindrical shape and wherein a longitudinal axis of the cylinder is oriented substantially parallel to a longitudinal axis of the vehicle.

7. The wheel suspension of claim 6, wherein the cylinder has a crowned face.

8. The wheel suspension of claim 3, further comprising an elastic element inserted between an outer face of the extension and an inner face of the recess.

9. The wheel suspension of claim 3, further comprising a material inserted between an outer face of the extension and an inner face of the recess for reducing surface friction between the extension and the recess.

10. The wheel suspension of claim 1, wherein the first rear joint element comprises a ball bearing.

11. A wheel suspension for a vehicle, comprising:
 a wheel carrier disposed within an internal space of a rear wheel of the vehicle; and
 a torsionally stiff transverse control arm pivotably mounted to the wheel carrier and extending between the wheel carrier and a frame rail of the vehicle, the control arm being pivotably mounted to the wheel carrier via first front and rear joint elements and pivotably mounted to the frame rail via second front and rear joint elements;
 wherein the first front joint element comprises a moveable bearing configured to transmit forces only in a direction that is parallel to a vertical axis of the vehicle.

12. The wheel suspension of claim 11, wherein the moveable bearing is formed by an extension on the control arm that is received in a recess in the wheel carrier.

13. The wheel suspension of claim 12, wherein the recess has an inner diameter that is substantially larger than a corresponding outer diameter of the extension in a direction that is parallel to longitudinal axis of the vehicle and in a direction that is parallel to a lateral axis of the vehicle, and wherein the inner diameter of the recess is insignificantly larger than the corresponding outer diameter of the extension in the direction parallel to the vertical axis of the vehicle.

14. The wheel suspension of claim 12, wherein the extension is spherically shaped.

15. The wheel suspension of claim 12, wherein the extension is cylindrically shaped and wherein a longitudinal axis of the cylinder is oriented substantially parallel to a longitudinal axis of the vehicle.

16. The wheel suspension of claim 15, wherein the cylinder has a crowned face.

17. The wheel suspension of claim 12, further comprising an elastic element inserted between an outer face of the extension and an inner face of the recess.

18. The wheel suspension of claim 12, further comprising a material inserted between an outer face of the extension and an inner face of the recess for reducing surface friction between the extension and the recess.

19. The wheel suspension of claim 11, wherein the first rear joint element comprises a ball bearing.

* * * * *